United States Patent
Chiang et al.

(10) Patent No.: US 11,122,471 B2
(45) Date of Patent: Sep. 14, 2021

(54) ON-DEMAND CIRCUIT-SWITCHED (CS) NETWORK REGISTRATION

(71) Applicant: T-Mobile USA, Inc., Bellevue, WA (US)

(72) Inventors: Hsin-Fu Henry Chiang, Bellevue, WA (US); Suresh Thanneeru, Redmond, WA (US); Syed Toaha Ahmad, Renton, WA (US); Boris Antsev, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/593,439

(22) Filed: Oct. 4, 2019

(65) Prior Publication Data

US 2021/0105670 A1 Apr. 8, 2021

(51) Int. Cl.
| | |
|---|---|
| *H04W 36/00* | (2009.01) |
| *H04W 60/04* | (2009.01) |
| *H04W 60/00* | (2009.01) |
| *H04W 8/04* | (2009.01) |
| *H04W 4/14* | (2009.01) |
| *H04W 8/26* | (2009.01) |
| *H04W 76/16* | (2018.01) |

(52) U.S. Cl.
CPC ......... *H04W 36/0022* (2013.01); *H04W 4/14* (2013.01); *H04W 8/04* (2013.01); *H04W 8/26* (2013.01); *H04W 60/005* (2013.01); *H04W 60/04* (2013.01); *H04W 76/16* (2018.02)

(58) Field of Classification Search
CPC . H04W 36/0022; H04W 60/005; H04W 8/04; H04W 8/26; H04W 4/14; H04W 60/04; H04W 76/16
See application file for complete search history.

(56) References Cited

U.S. PATENT DOCUMENTS

| | | | |
|---|---|---|---|
| 2012/0069731 A1* | 3/2012 | Tooher | H04W 76/16 370/221 |
| 2013/0329638 A1* | 12/2013 | Ren | H04W 60/005 370/328 |
| 2016/0360398 A1* | 12/2016 | Zhang | H04W 4/14 |
| 2017/0223521 A1* | 8/2017 | Jeong | H04W 8/065 |
| 2018/0139671 A1* | 5/2018 | Velev | H04W 76/38 |
| 2020/0187088 A1* | 6/2020 | Chun | H04W 48/14 |

* cited by examiner

*Primary Examiner* — Shailendra Kumar
(74) *Attorney, Agent, or Firm* — Lee & Hayes, P.C.

(57) ABSTRACT

Registration of a user equipment (UE) with a circuit-switched (CS) network can be controlled in an "on-demand" fashion by waiting for a trigger event before registering the UE with an available CS network. In some embodiments, CS registration of a UE may be triggered when the mobility management entity (MME) node receives, from the UE, a service request that was sent using Non-Access Stratum (NAS) protocol, such as an extended service request (ESR) or a short message service (SMS) over NAS request. In some embodiments, CS registration of a first UE may be triggered when the MME node receives, from a home subscriber server (HSS), a notification of an incoming session request originating from a second UE to establish a communication session over a CS network with the first UE.

20 Claims, 8 Drawing Sheets

ON-DEMAND CIRCUIT-SWITCHED (CS) NETWORK REGISTRATION

BACKGROUND

Cellular networks are constantly evolving. For example, fifth generation (5G) networks are evolving from fourth generation (4G) Long Term Evolution (LTE) networks, which, in turn, evolved from third generation (3G), and second generation (2G) networks. Because the evolution of these technologies takes time, today's cellular networks are "heterogeneous" by employing a mixture of newer (e.g., 5G) and legacy (e.g., 4G/3G/2G) radio access technology (RAT) systems. Although future cellular networks are likely to remain heterogeneous to some degree, it becomes cost prohibitive for a carrier to continue to support older RAT systems (e.g., 2G/3G, or circuit-switched (CS) systems) as newer radio technologies are brought to market. For this reason, many carriers are gradually phasing out the use of older RAT systems, such as 2G/3G RAT systems that employ a CS network.

As the use of CS networks are phased out, some carriers may leave the CS network intact and available, but may gradually cease to provide particular services over CS networks. This can cause issues to arise with user equipment (UEs). For example, if an issue with a preferred RAT (e.g., a 5G or a 4G Long-Term Evolution (LTE) RAT) arises such that a UE is unable to establish a voice-based communication session over the preferred RAT, the UE may reselect an available CS network, and the UE may stay "camped" on the CS network indefinitely, or for a long period of time, even after an available PS network has become available to the UE. When this so-called "CS leakage" occurs across a wide subscriber base, a large number of UEs can end up utilizing a CS network even when a newer, preferred RAT of a PS network is available to those UEs. While connected to a legacy RAT of a CS network, these UEs cannot avail themselves of the benefits of newer radio technologies (e.g., higher data transfer rates, better quality audio and/or video, etc.). Furthermore, a carrier may absorb extra costs when their subscribers are utilizing legacy RATs that are being phased out of its network. The adverse impacts of this issue can be severe, especially considering the vast number of UEs that may be reselecting a CS network, thereby placing significant stress on the CS network.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
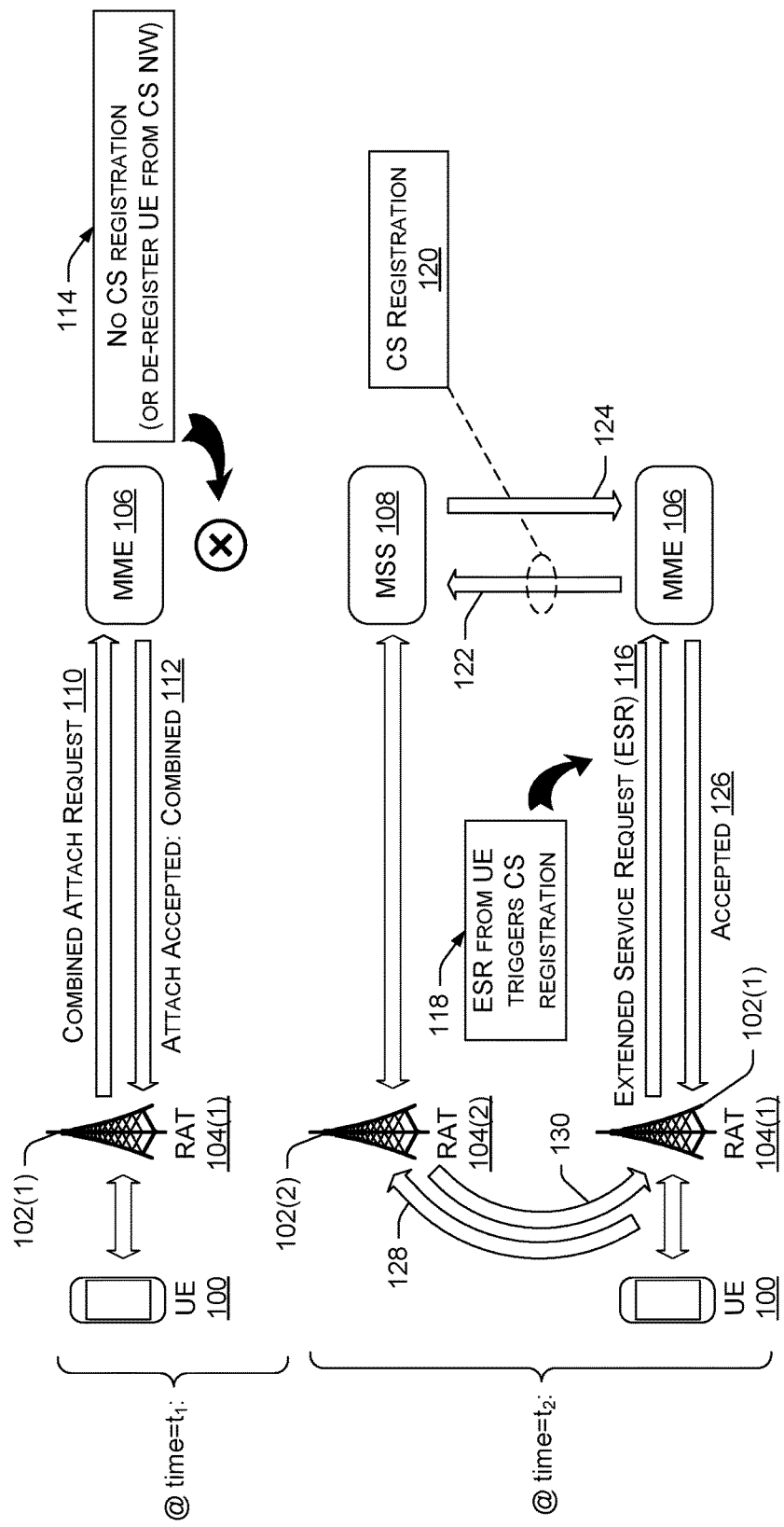
FIG. 1 is a diagram illustrating example signaling for implementing on-demand circuit-switched (CS) registration for an originating user equipment (UE) where the CS registration is triggered by an extended service request (ESR) from the originating UE.

Described herein are, among other things, techniques and systems for controlling the registration of a UE with a circuit-switched (CS) network in an "on-demand" fashion, rather than blindly registering the UE with an available CS network immediately in response to receiving a combined attach request from the UE. For example, a mobility management entity (MME) node of a telecommunications network, may receive a combined attach request from a UE, and may respond to the UE by sending a message to the UE, the message indicating that the combined attach request is accepted. However, instead of registering the UE with an underlying CS network at the time of receiving the combined attach request, the network node waits for a subsequent trigger event before registering the UE with an available CS network.

In some embodiments, CS registration of a UE may be triggered when the MME node receives, from the UE, a service request that was sent using Non-Access Stratum (NAS) protocol. For example, this service request may be an extended service request (ESR) received from an originating UE of a voice-based communication session. The UE may have sent the ESR to the MME node to request to fall back to a CS network in order to establish the voice-based communication session over the CS network. As another example, the service request may be a short message service (SMS) over NAS request received from the UE when the UE is initiating a data-based communication session (e.g., SMS text messaging session). Accordingly, an example process may include receiving, by a MME node, a combined attach request from a UE, and sending, by the MME node, to the UE, a message indicating that the combined attach request is accepted. The example process may continue by the MME node receiving a service request from the UE, the service request having been sent using NAS protocol, and, in response, the MME node may register the UE with a CS network.

In some embodiments, CS registration of a first UE may be triggered when the MME node receives, from a Home Subscriber Server (HSS), a notification of an incoming session request originating from a second UE to establish a communication session over a CS network with the first UE. Accordingly, an example process may include receiving, by a MME node, a combined attach request from a first UE, and sending, by the MME node, to the first UE, a message indicating that the combined attach request is accepted. The example process may continue by the MME node receiving, from a HSS, a notification of an incoming session request originating from a second UE to establish a communication session over a CS network with the first UE, and, in response, the MME may register the UE with a CS network By performing on-demand CS registration for UEs, as described herein, one or more devices can be configured to conserve resources with respect to communications bandwidth resources, processing resources, memory resources, power resources, and/or other resources. For instance, the techniques and systems described herein may result in a number of subscribers and/or UEs registered with a CS network that is less than a number of subscribers registered with a PS network (e.g., 5G network, a 4G LTE network, etc.). In other words, utilization of the CS network may be kept to a minimum by controlling CS registration per-device by using an "on-demand" CS registration technique whereby UEs are not registered with the CS network unless and until those UEs demand or request (or are demanded or requested) to utilize the CS network. This conserves resources that would normally be devoted to registering UEs with a CS network, and these resources can, therefore, be made available to other UEs when those other UEs actually demand (or are demanded to) utilize the CS network. Furthermore, the techniques and systems described herein do not require modification of logic on the UE, which means that the UE procedure for sending a combined attach request and receiving a network response can remain unchanged. Additional technical effects can also be realized from an implementation of the technologies disclosed herein.

In some implementations, the techniques and systems described herein can be implemented with a 5G network and a 5G-compliant UE, or a 4G LTE network and a 4G-compliant UE. However, the techniques and systems are not limited to implementations with a 5G network or a 4G network, and a person having ordinary skill in the art can readily recognize that any current or future radio technology may benefit from the on-demand CS registration techniques and systems described herein. Accordingly, examples presented herein often refer to a communication session that utilizes a preferred RAT, such as a "voice over new radio (VoNR)" session/call that utilizes a 5G or a 4G LTE RAT, and which is meant to cover either 5G or 4G LTE sessions (e.g., calls), as well as other current and/or future sessions that use a different radio technology than 5G or 4G, yet one that can benefit from the techniques and systems described herein. That said, a VoNR session, as used herein, can be distinguished from a call that uses a 2G/3G RAT. These and similar predecessor RATs are referred to herein as, "legacy RATs".

Also described herein are systems and devices comprising one or more processors and one or more memories, as well as non-transitory computer-readable media storing computer-executable instructions that, when executed, by one or more processors perform various acts and/or processes disclosed herein.

FIG. 1 is a diagram illustrating example signaling for implementing on-demand circuit-switched (CS) registration for an originating user equipment (UE) 100 where the CS registration is triggered by an extended service request (ESR) from the originating UE 100. In accordance with various embodiments described herein, the terms "user equipment (UE)," "communication device," "device," "wireless communication device," "wireless device," "mobile device," "terminal," "wireless terminal," "mobile terminal," and "client device," may be used interchangeably herein to describe any UE (e.g., the UE 100) that is capable of transmitting/receiving data, wirelessly and/or over wired networks, using any suitable communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), voice over New Radio (VoNR)—e.g., 5G, IEEE 802.1x protocols, WiMAX, Wi-Fi, Data Over Cable Service Interface Specification (DOCSIS), digital subscriber line (DSL), and/or any future IP-based network technology or evolution of an existing IP-based network technology.

Furthermore, although the UE 100 is shown as a mobile phone or handset in FIG. 1, the UE 100 (and other UEs described herein with reference to the following figures) may be implemented as any suitable type of communication device configured to communicate over a telecommunications network, including, without limitation, a mobile phone (e.g., a smart phone) or a handset, a tablet computer, a laptop computer, a portable digital assistant (PDA), a wearable computer (e.g., electronic/smart glasses, a smart watch, fitness trackers, etc.), an in-vehicle (e.g., in-car) computer, and/or any similar communication device. In addition, the UE 100 (and other UEs described herein with reference to the following figures) may be a mobile device, or the UE 100 may, alternatively, be a non-mobile (or situated) communication device including, without limitation, a television (smart television), a set-top-box (STB), a game console, a desktop computer, and the like.

In general, a user can utilize the UE 100 to communicate with other users and devices via a telecommunications network. Such a telecommunications network may represent a network comprising a plurality of network nodes disposed between the UE 100 and another device or user terminal. In some cases, the telecommunications network may be inclusive of the other device(s) that is communicating with the UE 100, such as when the UE 100 communicates with an application server or a similar network node. It is to be appreciated that a telecommunications network over which the UE 100 communicates can include any suitable types, and numbers, of network nodes to enable the transmission of IP multimedia over the telecommunications network. FIG. 1 shows at least some suitable network nodes and systems that may constitute at least part of the telecommunications network. For example, the telecommunications network may include, without limitation, various radio access networks (RANs) 102 (e.g., eNodeB, cell towers, wireless access points (APs), etc.). Each RAN 102 may be associated with a corresponding radio access technology (RAT) 104 (e.g., 5G, 4G, 3G, 2G, WiFi, combinations thereof, etc.). The telecommunications network may further include, without limitation, a mobility management entity (MME) node 106, and a mobile switching station (MSS) 108. A person having ordinary skill in the art will readily recognize that a telecommunications network may have several additional nodes that operate together to enable the establishment of a communication session, such as nodes of a backhaul network, and/or nodes of a multimedia telephony (MMTel) and IP Multimedia Subsystem (IMS) architecture (sometimes referred to as the "IMS core", the "IMS core network", the "IMS network", the "Core Network (CN)", or the "IM CN Subsystem"). IMS is an architectural framework defined by the 3rd Generation Partnership Project (3GPP) for delivering IP multimedia to UEs, such as the UE 100.

Various portions of the aforementioned telecommunications network, including the MME node 106 and the MSS 108, can be maintained and/or operated by one or more service providers, such as one or more wireless carriers (sometimes referred to as "operators"), that provide IMS-based services to users (sometimes called "subscribers") who are associated with UEs (e.g., the UE 100) for accessing the IMS-based services to which they have subscribed. For example, a service provider may offer multimedia telephony services that allow a subscribed user to call or message other users via the telecommunications network using his/her UE 100. A user can also utilize an associated UE 100 to receive, provide, or otherwise interact with various different IMS-based services by accessing the IMS core via various network nodes, such the MME node 106 and/or the MSS 108 shown in FIG. 1. In this manner, a carrier may offer any type of IMS-based service(s), such as telephony services (or voice calling), emergency services (e.g., E911), gaming services, instant messaging services, presence services, video conferencing services, social networking and sharing services, location-based services, push-to-talk services, WiFi calling services, real time text (RTT) calling services, RTT video calling services, and so on. In order to access one or more of these services, the UE 100 is configured to request establishment of a communication session. Although many of the examples described herein relate to voice calling services, it is to be appreciated that the UE 100 may request establishment of any type of communication session, such as a data-based communication session (e.g., SMS text).

Non-Access Stratum (NAS) is a set of protocols in the Evolved Packet System. NAS is used for transmitting non-radio signaling between a UE 100 and the MME node 106 (e.g., for an LTE/E-UTRAN access). From a protocol stack perspective, the NAS is the highest stratum of the control plane. NAS procedures can be grouped into two categories: (i) the Evolved Packet System (EPS) Mobility Management (EMM), and (ii) the EPS Session Management (ESM). EMM includes sub-groupings of: (i) EMM specific procedures, and (ii) EMM connection management procedures. An attach request (e.g., a combined attach request, as described herein) initiated by the UE 100 is an example of a EMM specific procedure. A service request, such as an extended service request (ESR), or a SMS over NAS request, initiated by the UE 100 is an example of a EMM connection management procedure. Therefore, an attach request, such as a combined attach request, is not a "service request," as used herein. As used herein, a "NAS request" is a message that is sent from a UE 100 to the MME node 106 of the telecommunications network using NAS protocol, and a "NAS response" is a message that is sent from the MME node 106 of the telecommunications network to a UE 100 using NAS protocol.

In FIG. 1, at time=$t_1$, the UE 100 is shown as sending a combined attach request 110 to the MME node 106 of the telecommunications network. For example, a user of the UE 100 may power-on the UE 100, causing the UE 100 to search for a preferred RAN 102(1) to which the UE 100 sends the combined attach request 110. This combined attach request 110 may be sent by the UE 100 as part of a combined attach procedure (e.g., as defined in 3GPP TS 24.301) to register the UE 100 with both a circuit-switched (CS) network and a packet-switched (PS) network. Such a combined attach request 110 may, for example, request that the UE 100 be registered with a PS network (e.g., a 5G network, a 4G LTE network, etc.) for evolved packet system (EPS) services, and also with a CS network (e.g., a 2G/3G network) for non-EPS services (sometimes referred to as "International Mobile Subscriber Identity (IMSI) attached"). The combined attach request 110 may be sent via a first RAN 102(1), such as a RAN 102(1) that is associated with a preferred RAT 104(1) (e.g., a 5G RAT, a 4G LTE RAT, etc.). The combined attach request 110 may be transmitted using NAS protocol, such that the request 110 may be considered a NAS request.

The MME node 106 receives, via the first RAN 102(1), the combined attach request 110 from the UE 100, and responds by sending, to the UE 100, a message 112 that acknowledges receipt of the request 110, and that provides an attach result (e.g., "attach accepted: combined", "attach accepted: EPS only", or "attach rejected"). In the example of FIG. 1, the message 112 indicates that the combined attach request 110 is accepted (e.g., attach accepted: combined). Of course, depending on the circumstances, the message 112 may include other attach results in the alternative, such as an attach result of "EPS only"—if, for example, an underlying CS network is unavailable to the UE 100, or an attach result of "Rejected"—if, for example, the MME node 106 (or another network node) determines that there is, or will be, an issue registering with either type of network. FIG. 1 assumes that both a PS network (e.g., a preferred RAT 104(1), such as a 5G RAT, a 4G LTE RAT, etc.) and a CS network (e.g., a legacy RAT 104(2), such as a 2G/3G RAT) are available to the UE 100 at time=$t_1$, when the UE 100 sends the combined attach request 110 to the MME node 106. This results in the MME node 106 sending, and the UE 100 receiving, a message 112 indicating that the combined attach request 110 is accepted.

At 114 of FIG. 1, at time=$t_1$, when the UE 100 sends the combined attach request 110 to the MME node 106, the MME node 106 refrains from registering the UE 100 with the CS network, or, if the UE 100 happens to be registered with the CS network when the combined attach request 110 is received, the MME node 106 may de-register the UE 100 from the CS network at 114. That is, the MME node 106 may determine whether the UE 100 is, or is not, presently registered with the CS network at 114 (e.g., by accessing a registry of UEs registered with the CS network), and, if registered, the MME node 106 may de-register the UE 100 from the CS network at 114. Regardless of whether the MME node 106 refrains from registering the UE 100 with the CS network or de-registers the UE 100 from the CS network, the lack of CS registration of the UE 100 occurs despite the availability of a CS network (e.g., RAN 102(2) associated with RAT 104(2), such as a 2G/3G RAT) and despite the sending of the message 112 indicating that the combined attach request 110 is accepted. In other words, the MME 106 is configured to "fake" the combined attach procedure by indicating to the UE 100 that the UE 100 is registered with a CS network when, in fact, the UE 100 is not registered with a CS network.

Avoiding CS registration of the UE 100 at 114 may help manage the capacity of the CS network (e.g., conserve resources of the CS network) by keeping the UE 100 unregistered with respect to the CS network, thereby leaving resources of the CS network unreserved/available for other UEs that actually demand utilization of those resources when the CS network is utilized. Avoiding CS registration of the UE 100 at 114 may also avoid so-called "CS leakage" by preventing the UE 100 from ending up "camped" on the CS network indefinitely (or for a long period of time), as described above, notwithstanding availability of a preferred, PS network (e.g., a 5G network, a 4G LTE network, etc.).

Using the techniques and systems of FIG. 1, the MME node 106 does not blindly register the UE 100 with the CS network. Instead, the MME node 106 waits to register the UE 100 with the CS network until a time at which the UE 100 actually demands utilization of the CS network (e.g., to establish a communication session). In practice, a vast majority of UEs 100s may seldom, or never, demand utilization of the CS network as long as a preferred RAT 104(1) of a PS network is, and remains, available to the UE 100. However, in some instances, a UE 100 may be configured to request utilization of a CS network, such as if a preferred, PS network is unavailable at a time when the UE 100 is trying to establish a voice-based communication session with another endpoint (e.g., another UE, a public safety answering point (PSAP), etc.). FIG. 1 illustrates one example trigger event that may cause the UE 100 to be registered with an available CS network in an on-demand fashion.

In FIG. 1, at time=$t_2$, the UE 100 is shown as sending an extended service request (ESR) 116 to the MME node 106. The ESR 116 may be sent via the first RAN 102(1), which, again, may be a RAN 102(1) that is associated with a preferred RAT 104(1) (e.g., a 5G RAT, a 4G LTE RAT, etc.). The ESR 116 may be transmitted using NAS protocol, such that the request 116 may be considered a NAS request. An "extended service request (ESR)" is a message that is sent by a UE 100 to the MME node 106 in order to request a circuit-switched fallback (CSFB) procedure, for example, indicating that the UE 100 had attempted to establish a communication session over the PS network and is requesting to fall back to the CS network. For example, the UE 100 may be an originating UE 100 (sometimes referred to as "MO UE" 100, "MO" meaning "mobile originated" or "mobile originating") of a communication session, meaning that the originating UE 100 is initiating the communication session (e.g., a user of the UE 100 may have dialed a phone number of a called party). An ESR can be triggered at the UE 100 by various events. For example, a UE 100 that does not have a voice-over IP (VoIP) capability or that has a VoIP capability disabled in user settings may send a ESR 116 to the MME node 106 when the user of the UE 100 makes a call by dialing a phone number. As another example, the UE 100 may start a timer while setting up a VoIP call over a preferred RAT 104(1) of a PS network, and if a timeout occurs before the UE 100 receives an expected network response, the UE 100 may send a ESR 116 to the MME node 106. As yet another example, a network node may send a signal to the UE 100 indicating that a VoIP call cannot be established.

The MME node 106 may receive, via the first RAN 102(1), the ESR 116 from the UE 100, and, at 118, the receipt of the ESR 116 from the UE 100 triggers the MME node 106 to register the UE 100 with the CS network. In other words, by sending the ESR 116 to the MME node 106, the UE 100 is informing the MME node 106 that the UE 100 wants to utilize the CS network for a communication session. Accordingly, in response to receiving the ESR 116 from the UE 100, the MME node 106 may perform CS registration 120 by registering the UE 100 with the CS network.

In some embodiments, one or more additional criteria are evaluated before registering the UE 100 with the CS network. For example, a current utilization of the CS network may be evaluated to determine if there is capacity or bandwidth in the CS network to handle the to-be-registered UE 100. For example, in response to receiving the ESR 116 from the UE 100, a determination may be made as to a number of UEs (and/or subscribers associated therewith) currently registered with the CS network, and the CS registration 120 may be performed for the UE 100 based at least in part on the number of UEs currently registered with the CS network. For example, the number of UEs currently registered with the CS network may be compared to a threshold number, and if the number of presently-registered UEs satisfies (e.g., meets, meets or exceeds) the threshold number, the UE 100 may not be registered with the CS network due to limitations in bandwidth or capacity of the CS network to handle additional UEs. If, however, the number of presently-registered UEs does not satisfy (e.g., does not meet, meets but does not exceed) the threshold number, the UE 100 may be registered with the CS network (i.e., CS registration 120 may be performed).

In some embodiments, the CS registration 120 of the UE 100 (i.e., registering the UE 100 with the CS network) may include sending, by the MME node 106, an identifier (ID) 122 associated with the UE 100 to the MSS 108. The MME node 106 may further receive information 124 from the MSS 108 that is usable to establish a communication session over the CS network. In some embodiments, the MME node 106 may send, to the UE 100, a message 126 indicating that the ESR 116 is accepted. This message 126 may include the information 124 the MME node 106 received from the MMS 108, which is usable by the UE 100 to establish the communication session over the CS network. For example, the information 124—received from the MSS 108 and forwarded by the MME node 106 to the UE 100—may include an identifier and/or an address of the RAN 102(2) associated with a legacy RAT 104(2) of the CS network, which allows the UE 100 to redirect 128 from the preferred RAN 102(1) to the RAN 102(2) associated with a legacy RAT 104(2) (e.g., 2G/3G RAT) of the CS network. This may cause the UE 100 to switch from a voice-over IP (VoIP) call to a CS call, for example. The RAN 102(1) may redirect 128 the UE 100 to the RAN 102(2), such as by sending an Inter RAT (IRAT) handover command to the UE 100, by cell reselection, or any other suitable redirection 128 technique.

The UE 100 may conduct the communication session over the CS network using the legacy RAT 104(2), and when the communication session is terminated, such as when a user hangs up a call, a network node (e.g., the MSS 108, the RAN 102(2), etc.) and/or logic of the UE 100 may cause the UE 100 to return 130 to the preferred RAN 102(1) associated with the preferred RAT 104(1) of the PS network. This so-called "fast return" 130 logic redirects the UE 100 to the PS network and prevents the UE 100 from staying camped on the legacy RAT 104(2) for longer than it needs to be there. That is, once the UE 100 is finished using the legacy RAT 104(2) of the CS network for the communication session, the UE 100 is redirected back (e.g., via return 130) to the preferred RAT 104(1) of the PS network.

It can be appreciated that the techniques and systems described with reference to FIG. 1 allow for better management of the capacity of a legacy CS network, which may help while phasing out a CS network from a carrier's network infrastructure. For instance, the techniques and systems of FIG. 1 may result in a number of subscribers registered with a CS network that is less than a number of subscribers registered with a PS network (e.g., a 5G network, a 4G LTE network, etc.). In other words, utilization of the CS network may be kept to a minimum by controlling CS registration 120 per-device by using an "on-demand" CS registration technique where UEs 100 are not registered with the CS network unless and until those UEs 100 demand or request utilization of the CS network. The techniques shown in FIG. 1 is useful for voice-based communication sessions, such as phone calls, where the UE 100 is attempting to establish a 5G Voice-over IP (VoIP) call using a 5G RAT, or a Voice-over LTE (VoLTE) call using a 4G LTE RAT (e.g., RAT 104(1)) of a PS network, and the UE 100 sends an ESR 116 to request an extension of service to a CS network, thereby triggering the CS registration 120 at 118 and redirecting the UE 100 to a RAN 102(2) associated with a legacy RAT 104(2) (e.g., a 2G/3G RAT) of the CS network.

Figure 2:
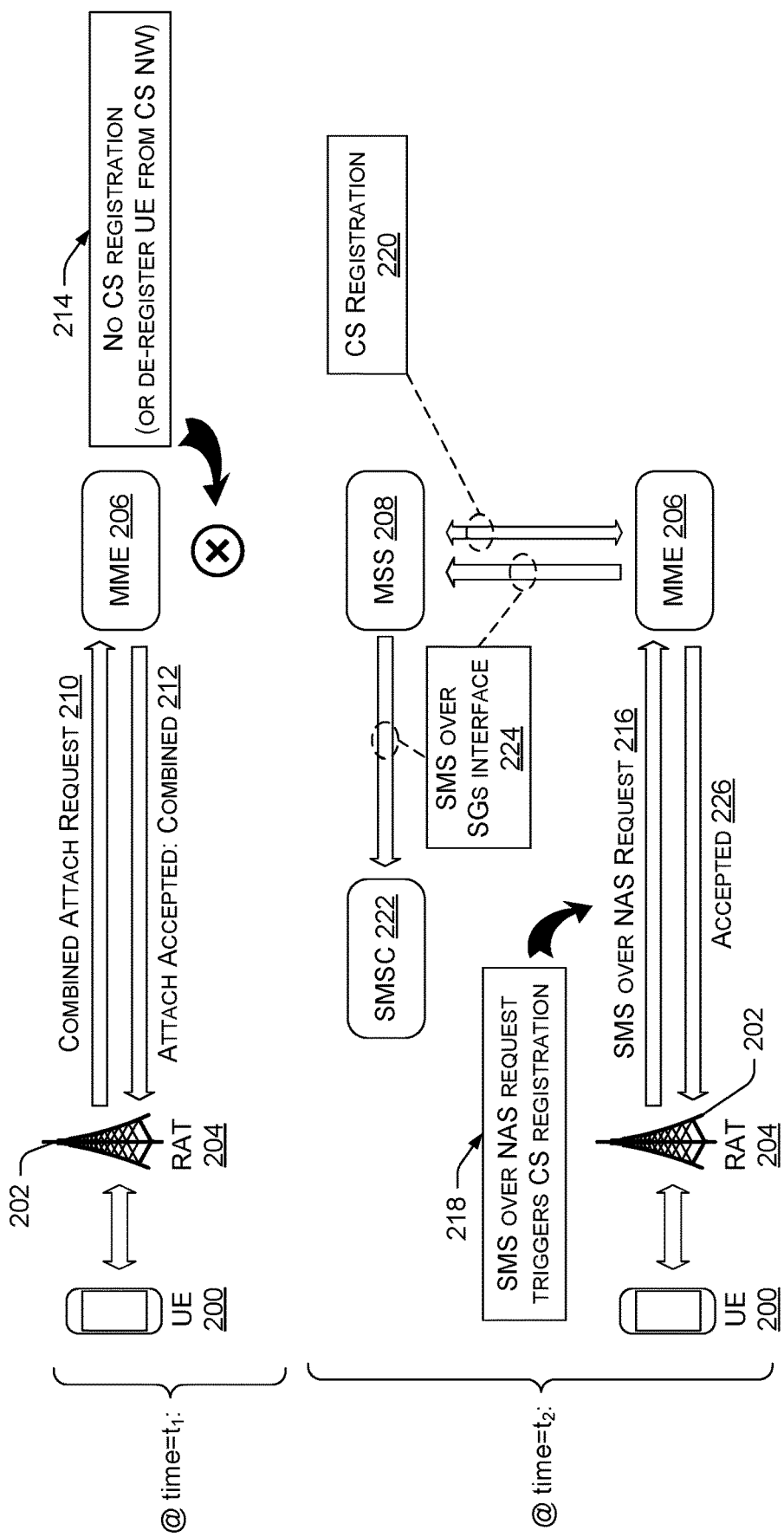
FIG. 2 is a diagram illustrating example signaling for implementing on-demand CS registration for an originating UE where the CS registration is triggered by a Short Message Service (SMS) over Non-Access Stratum (NAS) request from the originating UE.

FIG. 2 is a diagram illustrating example signaling for implementing on-demand CS registration for an originating UE 200 where the CS registration is triggered by a Short Message Service (SMS) over Non-Access Stratum (NAS) request from the originating UE 200. It is to be appreciated that the UE 200 may be similar to the UE 100 described herein. Furthermore, the RANs 202 may be similar to the RANs 102 described herein. Furthermore, the RATs 204 may be similar to the RATs 104 described herein. Furthermore, the MME node 206 may be similar to the MME node 106 described herein. Furthermore, the MSS 208 may be similar to the MSS 108 described herein.

In FIG. 2, at time=$t_1$, the UE 200 is shown as sending a combined attach request 210 to the MME node 206 of the telecommunications network. For example, a user of the UE 200 may power-on the UE 200, causing the UE 200 to search for a preferred RAN 202 to which the UE 200 sends the combined attach request 210. This combined attach request 210 may be similar to the combined attach request 110 described herein.

The MME node 206 receives, via the RAN 202, the combined attach request 210 from the UE 200, and responds by sending, to the UE 200, a message 212 that acknowledges receipt of the request 210, and that provides an attach result (e.g., "attach accepted: combined", "attach accepted: EPS only", or "attach rejected"). In the example of FIG. 2, like FIG. 1, the message 212 indicates that the combined attach request 210 is accepted (e.g., attach accepted: combined). Of course, depending on the circumstances, the message 212 may include other attach results, as described with reference to FIG. 1.

At 214 of FIG. 2, at time=$t_1$, when the UE 200 sends the combined attach request 210 to the MME node 206, the MME node 206 refrains from registering the UE 200 with the CS network, or, if the UE 200 happens to be registered with the CS network when the combined attach request 210 is received, the MME node 206 may de-register the UE 200 from the CS network at 214. That is, the MME node 206 may determine whether the UE 200 is, or is not, presently registered with the CS network at 214 (e.g., by accessing a registry of UEs registered with the CS network), and, if registered, the MME node 206 may de-register the UE 200 from the CS network at 214. Regardless of whether the MME node 206 refrains from registering the UE 200 with the CS network or de-registers the UE 200 from the CS network, the lack of CS registration of the UE 200 occurs despite the availability of a CS network (e.g., a 2G/3G RAT) and despite the sending of the message 212 indicating that the combined attach request 210 is accepted. In other words, the MME 206 is configured to "fake" the combined attach procedure by indicating to the UE 200 that the UE 200 is registered with a CS network when, in fact, the UE 200 is not registered with a CS network.

In FIG. 2, at time=$t_2$, the UE 200 is shown as sending a SMS over NAS request 216 to the MME node 206. The SMS over NAS request 216 may be sent via the RAN 202, which may be a RAN 202 that is associated with a preferred RAT 204 (e.g., a 4G LTE RAT). The SMS over NAS request 216, as its name implies, may be transmitted using NAS protocol, such that the request 216 may be considered a NAS request. This SMS over NAS request 216 may be an Uplink NAS Transport message sent by a UE 200 to the MME node 206 in order to request sending a SMS text message with a NAS message for transport, instead of using an IP-based message. A SMS over NAS request 216 can be triggered at the UE 200 by various events. For example, a UE 200 that does not have a capability for sending SMS over IP or that has such a capability disabled in user settings may send a SMS over NAS request 216 to the MME node 206 when the user of the UE 200 opens a SMS text messaging application, enters text, and tries to send the SMS text message. As another example, the UE 200 may start a timer while attempting to send a SMS text message over IP signaling of a preferred RAT 204 of a PS network, and if a timeout occurs before the UE 200 receives an expected network response, the UE 200 may send a SMS over NAS request 216 to the MME node 206. As yet another example, a network node may send a signal to the UE 200 indicating that SMS over IP cannot be supported. Accordingly, this SMS over NAS request 216 may indicate that the UE 200 had attempted to send (or establish a connection for sending) a SMS text message over IP signaling of the PS network and is requesting to fall back to "the CS network." CS network is in quotations here to denote the fact that the UE 200 will not have to actually redirect to a legacy RAN of a CS network to send the SMS text message(s). Rather, the UE 200 can stay attached to the preferred RAN 202 and may send the SMS text message(s) over NAS signaling via the preferred RAN 202 associated with a preferred RAT 204 (e.g., a 4G LTE RAT). That said, the UE 200 may still be required to register with the CS network for sending SMS text messages over NAS signaling.

The MME node 206 may receive, via the RAN 202, the SMS over NAS request 216 from the UE 200, and, at 218, the receipt of the SMS over NAS request 216 from the UE 200 triggers the MME node 206 to register the UE 200 with the CS network. In other words, by sending the SMS over NAS request 216 to the MME node 206, the UE 200 is informing the MME node 206 that the UE 200 wants to register with the CS network for a communication session. Accordingly, in response to receiving the SMS over NAS request 216 from the UE 200, the MME node 206 may perform CS registration 220 by registering the UE 200 with the CS network.

In some embodiments, one or more additional criteria are evaluated before registering the UE 200 with the CS network. For example, a current utilization of the CS network may be evaluated to determine if there is capacity or bandwidth in the CS network to handle the to-be-registered UE 200. For example, in response to receiving the SMS over NAS request 216 from the UE 200, a determination may be made as to a number of UEs (and/or subscribers associated therewith) currently registered with the CS network, and the CS registration 220 may be performed for the UE 200 based at least in part on the number of UEs currently registered with the CS network. For example, the number of UEs currently registered with the CS network may be compared to a threshold number, and if the number of presently-registered UEs satisfies (e.g., meets, meets or exceeds) the threshold number, the UE 200 may not be registered with the CS network due to limitations in bandwidth or capacity of the CS network to handle additional UEs. If, however, the number of presently-registered UEs does not satisfy (e.g., does not meet, meets but does not exceed) the threshold number, the UE 200 may be registered with the CS network (i.e., CS registration 220 may be performed).

In some embodiments, the CS registration 220 of the UE 200 (i.e., registering the UE 200 with the CS network) may include sending, by the MME node 206, an ID associated with the UE 200 to the MSS 208. In some embodiments, the MME node 206 may send, to the UE 200, a message 226 indicating that the SMS over NAS request 216 is accepted.

The UE 200 may conduct the communication session by transmitting and receiving NAS messages via the RAT 204, the NAS messages carrying SMS text payloads (e.g., text, images, video clips, etc.). In particular, the UE 200 may send a SMS text message as a NAS request to the MME node 206, the MME node 206 may forward the SMS text message to the MSS 208, and the MSS may forward the SMS text message to a Short Message Service Center (SMSC) 222 so that the SMS text message is ultimately received by a terminating endpoint (e.g., a second UE of another user). In the return path, a SMS text message is sent by the SMSC 222 to the MSS 208, the MSS 208 may forward the SMS text message to the MME node 206, and the MME node 206 may forward the SMS text message to the UE 200 as a NAS response sent via the RAT 204. As shown in FIG. 2, this message routing path may send SMS text messages over SGs interface. When the communication session is terminated, such as after a timeout period expires with no SMS text messages sent over NAS signaling, the UE 200 may re-establish a connection for sending SMS text messages over IP signaling of the PS network.

It can be appreciated that the techniques and systems described with reference to FIG. 2 allow for better management of the capacity of a legacy CS network, which may help while phasing out a CS network from a carrier's network infrastructure. For instance, the techniques and systems of FIG. 2 may result in a number of subscribers registered with a CS network that is less than a number of subscribers registered with a PS network (e.g., a LTE network). In other words, utilization of the CS network may be kept to a minimum by controlling CS registration 220 per-device by using an "on-demand" CS registration technique where UEs 200 are not registered with the CS network unless and until those UEs 200 demand or request utilization of the CS network. The techniques shown in FIG. 2 is useful for data-based communication sessions (or, non-voice-based communication session), such as SMS text messaging sessions, where the UE 200 is attempting to send SMS text messages over a preferred IP signaling layer of a PS network, and the UE 200 sends a SMS over NAS request 216 to request registration with the CS network to utilize NAS signaling for sending SMS text messages, thereby triggering the CS registration 220 at 218 and employing NAS messages for the transport of SMS text payloads.

Figure 3:
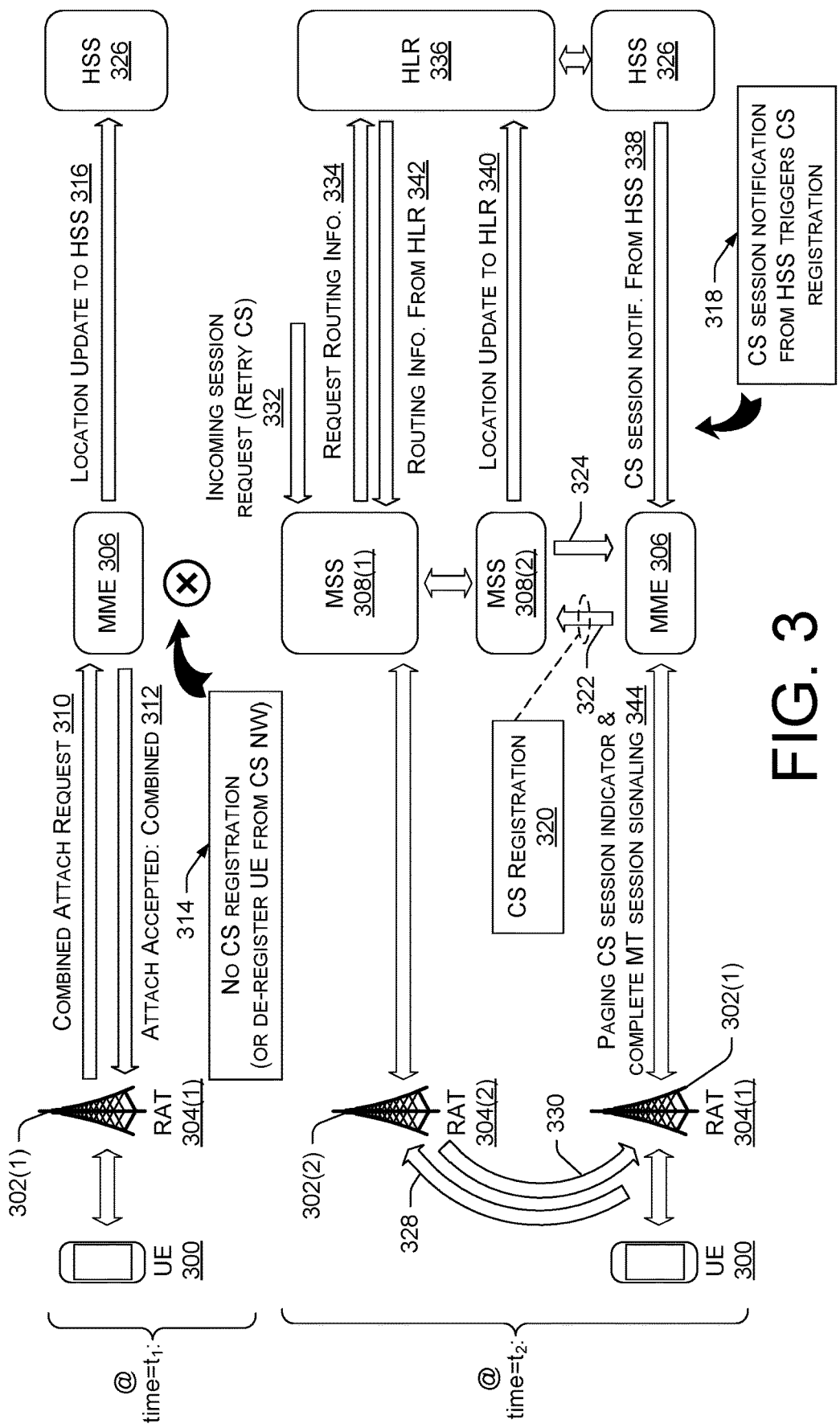
FIG. 3 is a diagram illustrating example signaling for implementing on-demand CS registration for a terminating UE where the CS registration is triggered by a notification of an incoming session request received from a Home Subscriber Server (HSS), the incoming session request requesting establishment of a communication session over a CS network.

FIG. 3 is a diagram illustrating example signaling for implementing on-demand CS registration for a terminating UE 300 where the CS registration is triggered by a notification of an incoming session request received from a Home Subscriber Server (HSS), the incoming session request requesting establishment of a communication session over a CS network. It is to be appreciated that the UE 300 may be similar to the UE 100 and/or the UE 200 described herein. Furthermore, the RANs 302 may be similar to the RANs 102 and/or the RANs 202 described herein. Furthermore, the RATs 304 may be similar to the RATs 104 and/or the RATs 204 described herein. Furthermore, the MME node 306 may be similar to the MME node 106 and/or the MME node 206 described herein. Furthermore, the MSSs 308 may be similar to the MSS 108 and/or the MSS 208 described herein.

In FIG. 3, at time=$t_1$, the UE 300 is shown as sending a combined attach request 310 to the MME node 306 of the telecommunications network. For example, a user of the UE 300 may power-on the UE 300, causing the UE 300 to search for a preferred RAN 302(1) to which the UE 300 sends the combined attach request 310. This combined attach request 310 may be similar to the combined attach request 110 and/or the combined attach request 210 described herein.

The MME node 306 receives, via the first RAN 302(1), the combined attach request 310 from the UE 300, and responds by sending, to the UE 300, a message 312 that acknowledges receipt of the request 310, and that provides an attach result (e.g., "attach accepted: combined", "attach accepted: EPS only", or "attach rejected"). In the example of FIG. 3, like FIGS. 1 and 2, the message 312 indicates that the combined attach request 310 is accepted (e.g., attach accepted: combined). Of course, depending on the circumstances, the message 312 may include other attach results, as described with reference to FIG. 1.

At 314 of FIG. 3, at time=$t_1$, when the UE 300 sends the combined attach request 310 to the MME node 306, the MME node 306 refrains from registering the UE 300 with the CS network, or, if the UE 300 happens to be registered with the CS network when the combined attach request 310 is received, the MME node 306 may de-register the UE 300 from the CS network at 314. That is, the MME node 306 may determine whether the UE 300 is, or is not, presently registered with the CS network at 314 (e.g., by accessing a registry of UEs registered with the CS network), and, if registered, the MME node 306 may de-register the UE 300 from the CS network at 314. Regardless of whether the MME node 306 refrains from registering the UE 300 with the CS network or de-registers the UE 300 from the CS network, the lack of CS registration of the UE 300 occurs despite the availability of a CS network (e.g., RAN 302(2) associated with RAT 304(2), such as a 2G/3G RAT) and despite the sending of the message 312 indicating that the combined attach request 310 is accepted. In other words, the MME 306 is configured to "fake" the combined attach procedure by indicating to the UE 300 that the UE 300 is registered with a CS network when, in fact, the UE 300 is not registered with a CS network.

In FIG. 3, at time=$t_1$, and in response to receiving the combined attach request 310, the MME node 306 may send a message 316 to a home subscriber server (HSS) 326 of the telecommunications network, the message 316 including location information for updating a location associated with the UE 300. This location update message 316 may be transmitted to the HSS 326 using Diameter protocol over a Diameter (Cx) interface. The HSS 326 may be associated with a master database (sometimes referred to herein as an "HSS repository") that maintains data pertaining to UEs, such as the UE 300, which have registered, or are in the process of registering, on the IMS network.

Similar to the description of FIG. 1, using the techniques and systems of FIG. 3, the MME node 306 does not blindly register the UE 300 with the CS network. Instead, the MME node 306 waits to register the UE 300 with the CS network until a time at which it is demanded for the UE 300 to utilize the CS network (e.g., to establish a communication session). FIG. 3 illustrates one example trigger event that may cause the UE 300 to be registered with an available CS network in an on-demand fashion when the UE 300 is acting as a terminating UE (sometimes referred to herein as "MT UE", "MT" meaning "mobile terminated" or "mobile terminating").

In FIG. 3, at time=$t_2$, a first MSS 308(1) may receive an incoming session request 332 (e.g., a voice call) originating from a second UE (not shown) to establish a communication session over a CS network with the first UE 300. In this scenario, the second UE that originated the session request 332 is the originating UE, and the first UE 300 shown in FIG. 3 is the terminating UE. The incoming session request 332 may be received by the first MSS 308(1) for various reasons, as described herein. For example, the second UE may not have a VoIP capability or may have a VoIP capability disabled in user settings when a user of the second UE makes a call by dialing a phone number, causing the call to be setup over a CS network. As another example, the second UE may start a timer while setting up a VoIP call over a preferred RAT of a PS network, and if a timeout occurs before the second UE receives an expected network response, the second UE may attempt to setup the call over the CS network. As yet another example, a network node may send a signal to the second UE indicating that a VoIP call cannot be established.

In any case, in response to receiving the incoming session request 332, the first MSS 308(1) may send a request 334 to a Home Location Register (HLR) 336 of the telecommunications network, the request 334 requesting routing information to route the incoming session request 332 to the appropriate network nodes that will ultimately allow for establishing the communication session with the terminating UE 300. Instead of rejecting this request 334 outright because the UE 300 is not presently registered with the CS network, the HLR 336 may send the request 334 to the HSS 326, or may otherwise notify the HSS 326 of the information pertaining to the routing information request 334, and the HSS 326, with access to this information from the HLR 336, may send a notification 338 to the MME node 306, the notification 338 indicating that there is an incoming session request 332 originating from a second UE to establish a communication session over a CS network with the first UE 300. The HSS 326 can identify the MME node 306 based at least in part on the location update message 316 it previously received from the MME node 306 at time=$t_1$.

The MME node 306 may receive the notification 338 of the incoming session request 332 from the HSS 326, and, at 318, the receipt of the notification 338 of the incoming session request 332 from the HSS 326 triggers the MME node 306 to register the UE 300 with the CS network. In other words, by sending the notification 338 of the incoming session request 332 to the MIME node 306, the HSS 326 is informing the MME node 306 that the first UE 300 will need to utilize the CS network for a communication session with the second UE. Accordingly, in response to receiving the notification 338 of the incoming session request 332 from the HSS 326, the MME node 306 may perform CS registration 320 by registering the first UE 300 with the CS network. This CS registration 320 may be similar to the CS registration 120 and/or the CS registration 220 described herein.

In some embodiments, one or more additional criteria are evaluated before registering the UE 300 with the CS network. For example, a current utilization of the CS network may be evaluated to determine if there is capacity or bandwidth in the CS network to handle the to-be-registered UE 300. For example, in response to receiving the notification 338 of the incoming session request 332 from the HSS 326, a determination may be made as to a number of UEs (and/or subscribers associated therewith) currently registered with the CS network, and the CS registration 320 may be performed for the UE 300 based at least in part on the number of UEs currently registered with the CS network. For example, the number of UEs currently registered with the CS network may be compared to a threshold number, and if the number of presently-registered UEs satisfies (e.g., meets, meets or exceeds) the threshold number, the UE 300 may not be registered with the CS network due to limitations in bandwidth or capacity of the CS network to handle additional UEs. If, however, the number of presently-registered UEs does not satisfy (e.g., does not meet, meets but does not exceed) the threshold number, the UE 300 may be registered with the CS network (i.e., CS registration 320 may be performed). In some embodiments, the CS registration 320 of the UE 300 (i.e., registering the UE 300 with the CS network) may include sending, by the MME node 306, an ID 322 associated with the UE 300 to a second MSS 308(2).

In response to the CS registration 320, the second MSS 308(2) may perform an operation(s) that allows the second MSS 308(2) to receive the relevant information about the incoming session request 332 from the first MSS 308(1) that received the incoming session request 332. For example, the second MSS 308(2) may send a message 340 to the HLR 336, the message 340 including location information for updating a location associated with the UE 300 within the HLR 336.

The HLR 336 may receive the location update message 340 from the second MSS 308(2) and may respond by sending a routing information response 342 to the first MSS 308(1), which had previously requested routing information from the HLR 336 via the request 334. This routing information provided in the response 342 may include information that allows the first MSS 308(1) to identify the appropriate network node (namely, the second MSS 308(2)) for establishing the communication session with the UE 300. Accordingly, the first MSS 308(1) may provide information to the second MSS 308(2) based on the routing information it received in the response 342 from the HLR 336, and the MME node 306 may receive, from the second MSS 308(2), information 324 that is usable to establish the communication session over the CS network for the first UE 300.

Using the information 324 received from the second MSS 308(2), the MME node 306 may send a page request 344 to the first UE 300 to establish the communication session over the CS network. This page request 344 may be sent to the UE 300 via the preferred RAN 302(1) associated with the preferred RAT 304(1) (e.g., a 5G RAT, a 4G LTE RAT, etc.). The page request 344 may include the information 324 the MME node 306 received from the second MIMS 308(2), which is usable by the UE 300 to establish the communication session over the CS network. For example, the information 324—received from the second MSS 308(2) and forwarded by the MME node 306 to the UE 300—may include an identifier and/or an address of the RAN 302(2) associated with a legacy RAT 304(2) of the CS network, which allows the UE 300 to redirect 328 from the preferred RAN 302(1) to the RAN 302(2) associated with a legacy RAT 304(2) (e.g., 2G/3G RAT) of the CS network. This may cause the UE 300 to switch from a VoIP call to a CS call, for example. The RAN 302(1) may redirect 328 the UE 300 to the RAN 302(2), such as by sending an IRAT handover command to the UE 300, by cell reselection, or any other suitable redirection 328 technique.

The UE 300 may conduct the communication session over the CS network using the legacy RAT 304(2), and when the communication session is terminated, such as when a user hangs up a call, a network node (e.g., the first MSS 308(1), the RAN 302(2), etc.) and/or logic of the UE 300 may cause the UE 300 to return 330 to the preferred RAN 302(1) associated with the preferred RAT 304(1) of the PS network. This so-called "fast return" 330 logic redirects the UE 300 to the PS network and prevents the UE 300 from staying camped on the legacy RAT 304(2) for longer than it needs to be there. That is, once the UE 300 is finished using the legacy RAT 304(2) of the CS network for the communication session, the UE 300 is redirected back (e.g., via return 330) to the preferred RAT 304(1) of the PS network.

It can be appreciated that the techniques and systems described with reference to FIG. 3 allow for better management of the capacity of a legacy CS network, which may help while phasing out a CS network from a carrier's network infrastructure. For instance, the techniques and systems of FIG. 3 may result in a number of subscribers registered with a CS network that is less than a number of subscribers registered with a PS network (e.g., a 5G network, a 4G LTE network, etc.). In other words, utilization of the CS network may be kept to a minimum by controlling CS registration 320 per-device by using an "on-demand" CS registration technique where UEs 300 are not registered with the CS network unless and until it is demanded or requested that those UEs 300 utilize the CS network. The techniques shown in FIG. 3 is useful for voice-based communication sessions, such as phone calls, where the UE 300 is a terminating UE 300 of session that is being established over the CS network. It is also to be appreciated, however, that techniques similar to those shown in FIG. 3 may be used for data-based communication sessions (or non-voice-based communication sessions), such as SMS text messaging sessions, where the UE 300 may be receiving a SMS text message over NAS signaling, similar to the scenario of FIG. 2, but with the UE 300 as a terminating UE. In this case, the incoming session request 332 may represent a request to establish a SMS text messaging session with the UE 300, and the page request 344 may be a SMS over NAS response (e.g., a Downlink NAS Transport message) sent by the MME node 306 to the UE 300 in order to transport SMS text message payloads with NAS messages, instead of using an IP-based message for transport of SMS text message payloads.

It is also to be appreciated that, instead of a "network-controlled" approach to on-demand CS registration, as described herein, a UE-centric approach may be taken to modify logic of the UE itself to control CS registration of UEs in an on-demand fashion. Such an approach may involve changing the way that attach requests are sent to the MME 306 (e.g., a new form of attach request that prevents the UE from being blindly registered with a CS network that is available to the UE).

The processes described in this disclosure may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

Figure 4:
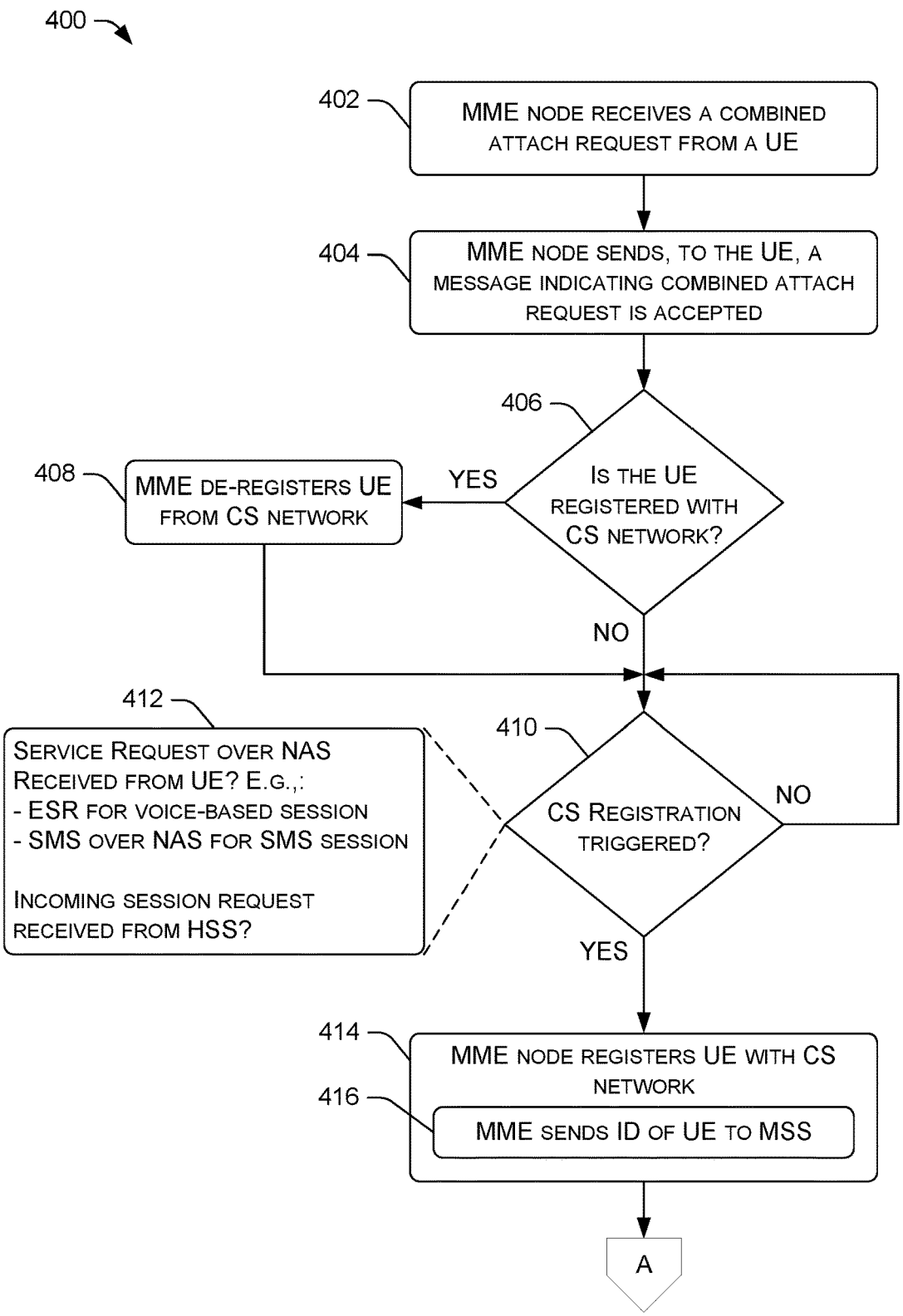
FIG. 4 illustrates a flowchart of an example process for performing CS registration for a UE, on-demand.

FIG. 4 illustrates a flowchart of an example process 400 for performing CS registration for a UE, on-demand. The process 400 is described, by way of example, with reference to the previous figures. The process 400 may be implemented by a system (e.g., the system 800 of FIG. 8) that includes a MME node 106/206/306, as described herein. Accordingly, reference is made to a MME node 106/206/306 in describing the process 400, as the MME node 106/206/306 may perform at least some of the operations of the process 400.

At 402, a MME node 106/206/306 of a telecommunications network may receive a combined attach request 110/210/310 from a UE 100/200/300. For example, a user of the UE 100/200/300 may power-on the UE 100/200/300, causing the UE 100/200/300 to search for a preferred RAN 102/202/302 to which the UE 100/200/300 sends the combined attach request 110/210/310. This combined attach request 110/210/310 may be sent by the UE 100 as part of a combined attach procedure (e.g., as defined in 3GPP TS 24.301) to register the UE 110/210/310 with both a CS network and a PS network, as described herein. The combined attach request 110/210/310 may be transmitted using NAS protocol.

At 404, the MME node 106/206/306 may send, to the UE 100/200/300, a message 112/212/312 indicating that the combined attach request 110/210/310 is accepted. For example, the message 112/212/312 may include an attach result (e.g., "attach accepted: combined"), indicating that the combined attach request 110/210/310 is accepted.

At 406, the MME node 106/206/306 may determine whether the UE 100/200/300 is presently registered with a CS network. For example, the MME node 106/206/306 may access a registry of UEs registered with the CS network to make this determination at block 406. If the UE 100/200/300 is presently registered with a CS network (e.g., if the MME node 106/206/306 identifies an identifier in the registry that matches an identifier received from the UE 100/200/300), the process 400 may follow the "YES" route from block 406 to block 408.

At 408, the MME node 106/206/306 may de-register the UE 100/200/300 from the CS network, based on the UE 100/200/300 being presently registered with the CS network. For example, the MME node 106/206/306 may remove or delete (or cause to be removed or deleted) an identifier of the UE from the registry accessed by the MME node 106/206/306.

At 410, after de-registering the UE 100/200/300 from the CS network, or, if the MME node 106/206/306 determines, at block 406, that the UE 100/200/300 is not presently registered with a CS network, causing the process 400 to follow the "NO" route from block 406 to block 410, the MME node 106/206/306 may determine whether CS registration 120/220/320 is triggered. As shown by block 412, CS registration 120/220/320 can be triggered in several ways, depending on the operating mode of the UE 100/200/300 (e.g., whether the UE 100/200/300 is operating as a MO UE or a MT UE) and/or the type of communication session (e.g., a voice-based communication session or a data-based communication session, such as SMS text messaging session).

For example, the determination at block 410 as to whether CS registration 120/220/320 is triggered may include the MME node 106/206/306 receiving a service request from the UE 100/200/300, the service request having been sent using NAS protocol. Receiving a service request from the UE 100/200/300 may include receiving, by the MME node 106/206/306, an ESR 116 from the UE 100/200/300. An ESR 116 may indicate that the UE 100/200/300 is requesting to fall back to a CS network for a voice-based communication session. Receiving a service request from the UE 100/200/300 may include receiving, by the MME node 106/206/306, a SMS over NAS request 216 from the UE 100/200/300, such as an Uplink NAS Transport message. These examples pertain to a UE 100/200/300 operating as an originating UE (or, MO UE). If the UE 100/200/300 is operating as a terminating UE (or, MT UE), the determination at block 410 as to whether CS registration 120/220/320 is triggered may include the MME node 106/206/306 receiving, from a HSS 326, a notification 338 of an incoming session request 332 originating from a second UE to establish a communication session over a CS network with the UE 100/200/300.

If CS registration 120/220/320 is not triggered at block 410, the process 400 may follow the "NO" route from block 410, causing the process 400 to iterate the determination at block 410. If CS registration 120/220/320 is triggered at block 410, the process 400 may follow the "YES" route from block 410 to block 414.

At 414, in response to the CS registration 120/220/320 being triggered (e.g., receiving of a NAS-based service request, such as an ESR 116 or a SMS over NAS request 216, from the UE 100/200/300, receiving a notification 338 of an incoming session request from the HSS 326, etc.), the MME node 106/206/306 may register the UE 100/200/300 with the CS network. As shown by sub-block 416, this registration step may include the MME node 106/206/306 sending an ID associated with the UE 100/200/300 to a MSS 108/208/308. Accordingly, the UE 100/200/300 is registered with the CS network on-demand in response to a trigger event, rather than the UE 100/200/300 being blindly registered at the time of receiving the combined attach request at block 402.

Figure 5:
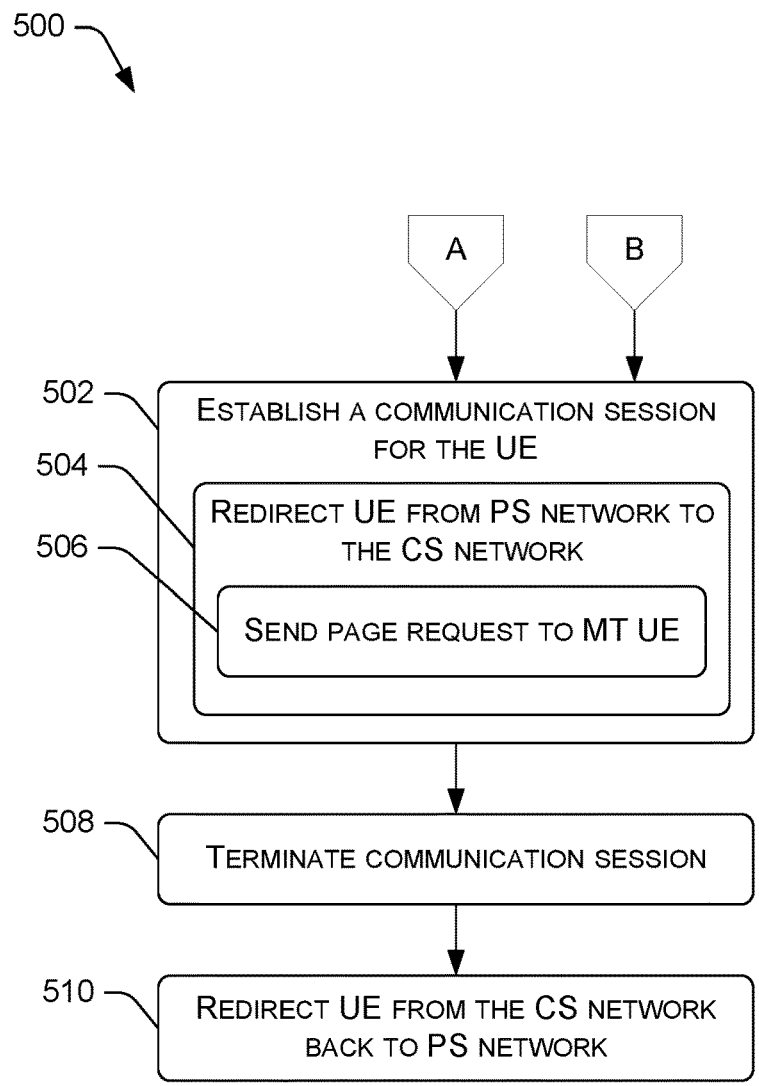
FIG. 5 illustrates a flowchart of an example process for returning a UE back to a PS network after a communication session over a CS network has terminated.

FIG. 5 illustrates a flowchart of an example process 500 for returning a UE back to a PS network after a communication session over a CS network has terminated. The process 500 is described, by way of example, with reference to the previous figures. Furthermore, as shown by off-page reference "A" in FIGS. 4 and 5, the process 500 may continue from block 414 of FIG. 4, after the MME node 106/206/306 registers the UE 100/200/300 with the CS network.

At 502, a communication session may be established for the UE 100/200/300. As described herein, for a voice-based communication session, the communication session may be established over the CS network with which the UE 100/200/300 was previously registered. For example, as shown by sub-block 504, the MME node 106/206/306 (or a different network node, such as a RAN 102/202/302) may redirect UE from a PS network to the CS network. In the terminating UE (MT UE) scenario, this may include the MME node 106/206/306 sending a page request 344 to the UE 100/200/300, as shown by sub-block 506, the page request 344 for establishing the voice-based communication session over the CS network. For a data-based communication session (e.g., a SMS text messaging session), the establishment of the communication session for the UE 100/200/300 at block 502 may include establishing a connection over a NAS signaling layer to allow the UE 100/200/300 to send SMS text messages using NAS protocol.

At 508, the communication session may be terminated. For example, a voice-based communication session (e.g., a call) established over the CS network may be terminated. Terminating the communication session may occur at block 508 in response to a party of the communication session providing user input to his/her UE, for example by hanging up a call.

At 510, the UE 100/200/300 may be redirected from the CS network back to the PS network based at least in part on terminating the communication session at block 508. This so-called "fast return" logic redirects the UE 100/200/300 to the PS network and prevents the UE 100/200/300 from staying camped on the legacy RAT 104(2)/304(2) for longer than it needs to be there. That is, once the UE 100/200/300 is finished using the legacy RAT 104(2)/304(2) of the CS network for the communication session, the UE 100/200/300 is redirected back to a preferred RAT 104(1)/304 of the PS network It is to be appreciated that, if the UE 100/200/300 sends a second, subsequent combined attach request 110/210/310 to the MME 106/206/306 at any point, such as after the UE 100/200/300 is moved to another geographic location, after power cycling the UE 100/200/300, etc., the process 400 may iterate, whereby the UE 100/200/300, if still registered with the CS network, will be de-registered at block 408 of the process 400. For example, following block 510, the MME node 106/206/306 may receive, at block 402, a second combined attach request 110/210/310 from the UE 100/200/300, send, at block 404, a second message 112/212/312 to the UE 100/200/300 indicating that the second combined attach request 110/210/310 is accepted, determine, at block 406, that the UE 100/200/300 is presently registered with the CS network, and de-register the UE 100/200/300 from the CS network at block 408.

Figure 6:
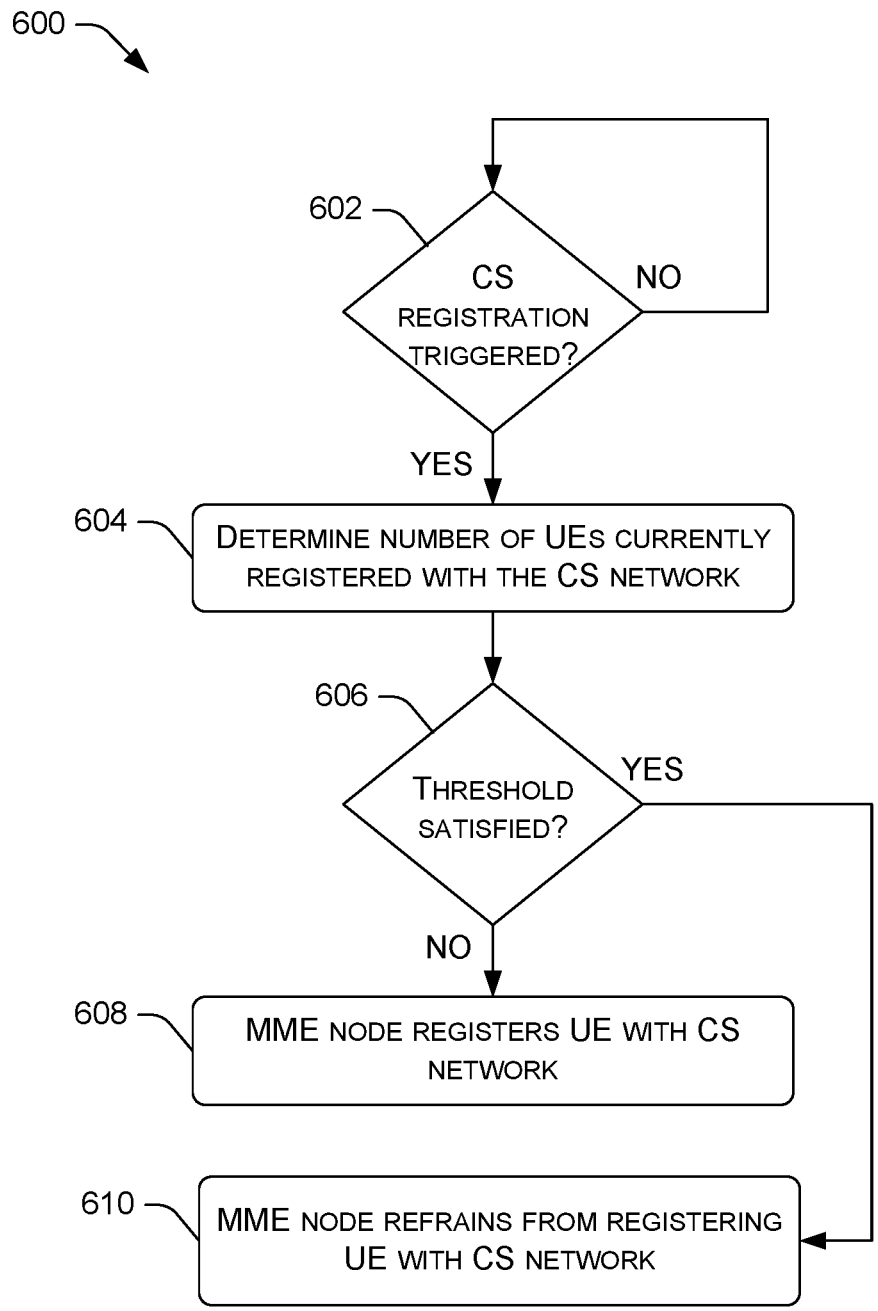
FIG. 6 illustrates a flowchart of an example process for registering a UE with a CS network based on a capacity metric of the CS network.

FIG. 6 illustrates a flowchart of an example process 600 for registering a UE with a CS network based on a capacity metric of the CS network. The process 600 is described, by way of example, with reference to the previous figures.

At 602, a determination is made as to whether CS registration 120/220/320 is triggered for a UE 100/200/300. For example, CS registration 120/220/320 may be triggered if the MME node 106/206/306 receives a service request from the UE 100/200/300 that was sent using NAS protocol (e.g., a ESR 116 or a SMS over NAS request 216), or if the MME node 106/206/306 receives, from the HSS 326, a notification 338 of an incoming session request 332 (e.g., an incoming call over CS).

At 604, a number of UEs currently registered with the CS network may be determined by the MME node 106/206/306. For example, the MME node 106/206/306 may access a registry of UEs to determine a number of UEs currently/presently registered with the CS network.

At 606, the number of UEs currently registered with the CS network may be compared to a threshold number to determine whether the threshold is satisfied. The threshold may be satisfied if the number of registered UEs meets or exceeds the threshold number, or if the number of registered UEs strictly exceeds the threshold number. For instance, there may be a limit to the number of UEs that the CS network can handle at any given time. Hence, the number of UEs currently registered with the CS network can be thought of as a capacity metric, and a carrier who owns and/or operates the CS network may set an appropriate threshold number of UEs that it wants to allow to be registered with the CS network at any given moment, which helps to manage the utilization and capacity of the CS network. If the threshold number is not satisfied at block 606 (e.g., if the number of registered UEs is below the threshold number, or at or below the threshold number), the process 600 may follow the "NO" route from block 606 to block 608.

At 608, based at least in part on the number of UEs currently registered with the CS network, the MME node 106/206/306 may register the UE 100/200/300 with the CS network. If the threshold number is satisfied at block 606

(e.g., if the number of registered UEs exceeds the threshold number, or meets or exceeds the threshold number), the process 600 may follow the "YES" route from block 606 to block 610.

At 610, the MME node 106/206/306 may refrain from registering the UE 100/200/300 with the CS network. This may help manage the capacity of the CS network by limiting the number of UEs that are registered with the CS network at any given moment, which may be useful when phasing out a CS network.

Figure 7:
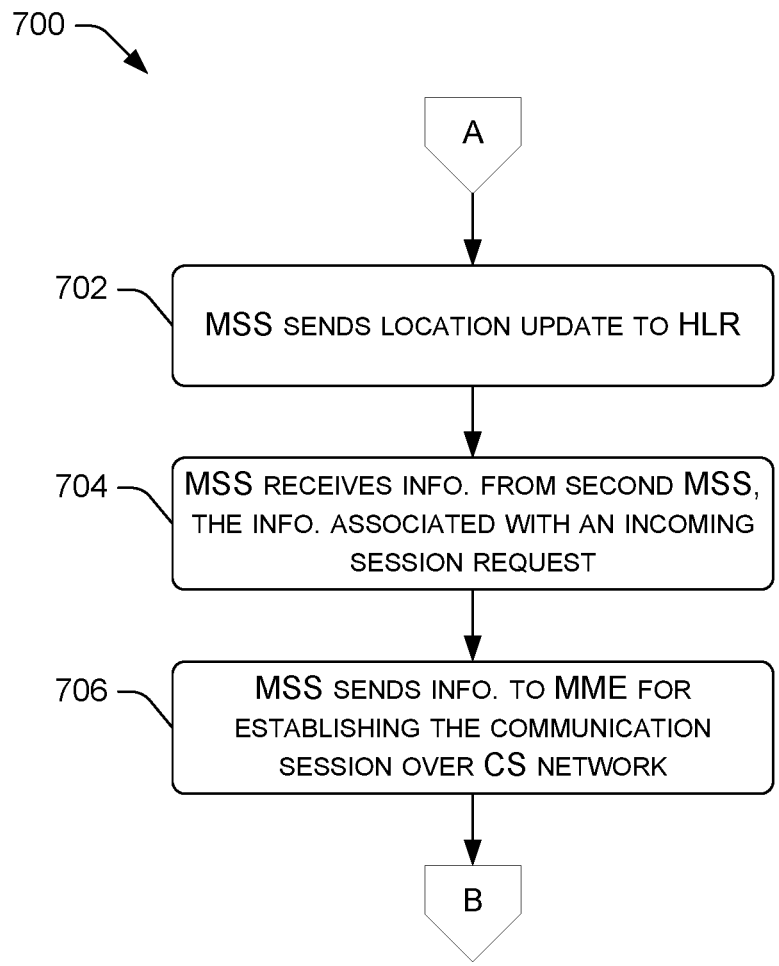
FIG. 7 illustrates a flowchart of an example process for establishing a communication session for a terminating UE that has been registered with a CS network, on-demand.

FIG. 7 illustrates a flowchart of an example process 700 for establishing a communication session for a terminating UE that has been registered with a CS network, on-demand. The process 700 is described, by way of example, with reference to the previous figures. Furthermore, as shown by off-page reference "A" in FIGS. 4 and 7, the process 700 may continue from block 414 of FIG. 4, after the MME node 106/206/306 registers the UE 100/200/300 with the CS network.

At 702, after the MME 306 registers the UE 300 with the CS network by sending an ID of the UE 300 to a (first) MSS 308(2), the (first) MSS 308(2) may send a location update 340 to a HLR 336. This may provide updated location information for the UE 300 that was registered with the CS network. The HLR 336 may send routing information 342 to a second MSS 308(1) that received the incoming session request 332 originated by a second UE (MO UE), and the second MSS 308(1) may send information to the (first) MSS 308(2).

Accordingly, at 704, the (first) MSS 308(2) may receive, from the second MSS 308(1), information associated with the incoming session request 332. This is based on the second MSS 308(1) having received the routing information 342 from the HLR 336.

At 706, the (first) MSS 308(2) may send, to the MME node 306, the information, or different information 324 that is based on the information, to include in a page request 344 to the UE 300 for establishing the communication session over the CS network. As shown by the off-page reference "B" in FIGS. 5 and 7, the process 500 may continue from block 706 of the process 700, such as by establishing a communication session for the UE 300 at block 502.

Figure 8:
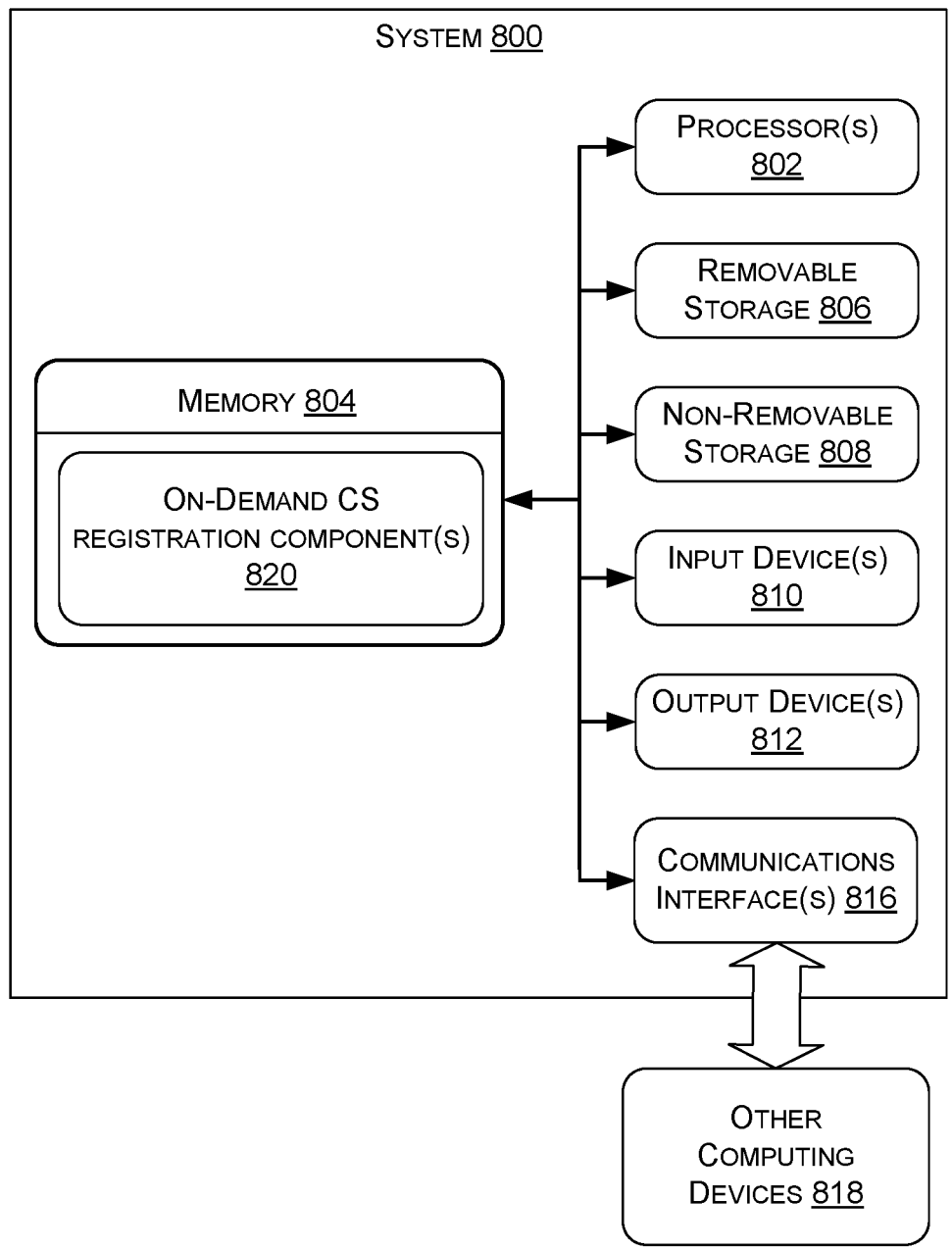
FIG. 8 is a block diagram of an example system configured to implement on-demand CS registration for a UE.

FIG. 8 is a block diagram of an example system 800 configured to implement on-demand CS registration for a UE. The system 800 may include one or more network nodes of a telecommunications network. For example, the system 800 may represent a MME node(s) 106/206/306. In some embodiments, the system 800 may represent multiple different nodes including the MME node(s) 106/206/306 and one or more additional network nodes including, without limitation, a RAN(s) 104/204/304, a MSS(s) 108/208/308, a HSS(s) 326, a HLR(s) 336, and/or a SMSC(s) 222.

As shown, the system 800 may include one or more processors 802 and one or more forms of computer-readable memory 804. The system 800 may also include additional storage devices. Such additional storage may include removable storage 806 and/or non-removable storage 808.

The system 800 may further include input devices 810 and output devices 812 communicatively coupled to the processor(s) 800 and the computer-readable memory 804. The system 800 may further include communications interface(s) 816 that allow the system 800 to communicate with other computing devices 818 (e.g., UEs, other network nodes, etc.) such as via a network. The communications interface(s) 818 may facilitate transmitting and receiving wired and/or wireless signals over any suitable communications/data technology, standard, or protocol, as described herein.

In various embodiments, the computer-readable memory 804 comprises non-transitory computer-readable memory 804 that generally includes both volatile memory and non-volatile memory (e.g., random access memory (RAM), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other medium). The computer-readable memory 804 may also be described as computer storage media and may include volatile and nonvolatile, removable and non-removable media implemented in any method or technology for storage of information, such as computer readable instructions, data structures, program modules, or other data. Computer-readable memory 804, removable storage 806 and non-removable storage 808 are all examples of non-transitory computer-readable storage media. Computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the system 800. Any such computer-readable storage media may be part of the system 800.

The memory 804 can include an on-demand CS registration component(s) 820, which may represent computer-executable instructions (or logic) that, when executed, by the processor(s) 802, perform the various acts and/or processes disclosed herein.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

We claim:

1. A method comprising:
receiving, by a mobility management entity (MME) node of a telecommunications network, a combined attach request from a user equipment (UE);
sending, by the MME node, to the UE, a message indicating that the combined attach request is accepted;
determining, by the MME, that the UE is presently registered with a first circuit-switched (CS) network;
de-registering, by the MME and at least in part in response to receiving the combined attach request, the UE from the first CS network;
receiving, by the MME node, an extended service request (ESR) from the UE indicating that the UE is requesting to fall back to a second CS network; and
in response to receiving the combined attach request and the ESR from the UE:
registering the UE with the second CS network; and
establishing the voice-based communication session over the second CS network.

2. The method of claim 1, further comprising:
terminating the voice-based communication session over the CS network; and
redirecting the UE from the second CS network to a packet-switched (PS) network based at least in part on terminating the voice-based compunction session.

3. The method of claim 1, wherein:
receiving, by the MME node, a second combined attach request from the UE;
sending, by the MME node, to the UE, a second message indicating that the second combined attach request is accepted;
determining that the UE is presently registered with the second CS network; and
de-registering, by the MME node, the UE from the second CS network based on the UE being presently registered with the second CS network.

4. The method of claim 1, further comprising:
in response to the receiving of the ESR from the UE, determining a number of UEs currently registered with the second CS network,
wherein the registering the UE with the second CS network is based at least in part on the number of UEs currently registered with the second CS network.

5. The method of claim 1, wherein the ESR received from the UE was sent using Non-Access Stratum (NAS) protocol.

6. A system comprising:
one or more processors; and
memory storing computer-executable instructions that, when executed by the one or more processors, cause the system to:
receive a combined attach request from a user equipment (UE);
determine that the UE is presently registered with a first circuit-switched (CS) network;
de-register, at least in part in response to receiving the combined attach request, the UE from the first CS network;
send, to the UE, a message indicating that the combined attach request is accepted;
receive a service request from the UE, the service request having been sent using Non-Access Stratum (NAS) protocol; and
in response to receiving the combined attach request and the service request from the UE, register the UE with a second circuit-switched (CS) network.

7. The system of claim 6, wherein the one or more processors and the memory storing the computer-executable instructions are implemented on a mobility management entity (MME) node of a telecommunications network.

8. The system of claim 7, wherein registering the UE with the CS network comprises sending, by the MME node, an identifier (ID) associated with the UE to a mobile switching station (MSS) of the second CS network.

9. The system of claim 6, wherein the service request received from the UE comprises an extended service request (ESR), and wherein the computer-executable instructions, when executed by the one or more processors, further cause the system to establish a voice-based communication session over the second CS network in response to registering the UE with the second CS network.

10. The system of claim 9, wherein the computer-executable instructions, when executed by the one or more processors, further cause the system to:
terminate the voice-based communication session over the second CS network; and
redirect the UE to a packet-switched (PS) network based at least in part on terminating the voice-based communication session.

11. The system of claim 6, wherein the service request received from the UE comprises a Short Message Service (SMS) over NAS request.

12. The system of claim 6, wherein the computer-executable instructions, when executed by the one or more processors, further cause the system to:
receive a second combined attach request from the UE;
send, to the UE, a second message indicating that the second combined attach request is accepted; and
de-register the UE from the second CS network.

13. The system of claim 6, wherein the computer-executable instructions, when executed by the one or more processors, further cause the system to:
in response to receiving the service request from the UE, determine a number of UEs currently registered with the second CS network,
wherein registering the UE with the second CS network is based at least in part on the number of UEs currently registered with the second CS network.

14. A method comprising:
receiving, by a mobility management entity (MME) node of a telecommunications network, a combined attach request from a first user equipment (UE);
sending, by the MME node, to the first UE, a message indicating that the combined attach request is accepted;
refraining, at least in part in response to receiving the combined attach request, from registering the UE with a circuit-switched (CS) network;
receiving, by the MME node, from a Home Subscriber Server (HSS), a notification of an incoming session request originating from a second UE to establish a communication session over the CS network with the first UE; and
in response to receiving the attach request and the notification from the HSS, registering, by the MME node, the first UE with the CS network.

15. The method of claim 14, wherein the communication session is a voice-based communication session, the method further comprising sending, by the MME node, a page request to the first UE for establishing the voice-based communication session over the CS network.

16. The method of claim 15, further comprising:
terminating the voice-based communication session over the CS network; and
redirecting the first UE to a packet-switched (PS) network based at least in part on terminating the voice-based communication session.

17. The method of claim 14, further comprising:
receiving, by the MME node, a second combined attach request from the first UE;
sending, by the MME node, to the first UE, a second message indicating that the second combined attach request is accepted; and
de-registering, by the MME node, the UE from the CS network.

18. The method of claim 14, further comprising:
in response to the receiving of the notification from the HSS, determining a number of UEs currently registered with the CS network,
wherein the registering the first UE with the CS network is based at least in part on the number of UEs currently registered with the CS network.

19. The method of claim 14, wherein the registering the first UE with the CS network comprises sending, by the MME node, an identifier (ID) associated with the first UE to a mobile switching station (MSS).

20. The method of claim 19, further comprising, after the sending the ID associated with the first UE to the MSS:
sending, by the MSS, a location update to a Home Location Register (HLR);
receiving, by the MSS, from a second MSS, information associated with the incoming session request; and
sending, by the MSS, to the MME node, the information, or different information based on the information, to include in a page request to the first UE for establishing the communication session over the CS network.

* * * * *